(No Model.)
C. E. LUBURG.
CARRIAGE BRAKE.
No. 353,870. Patented Dec. 7, 1886.
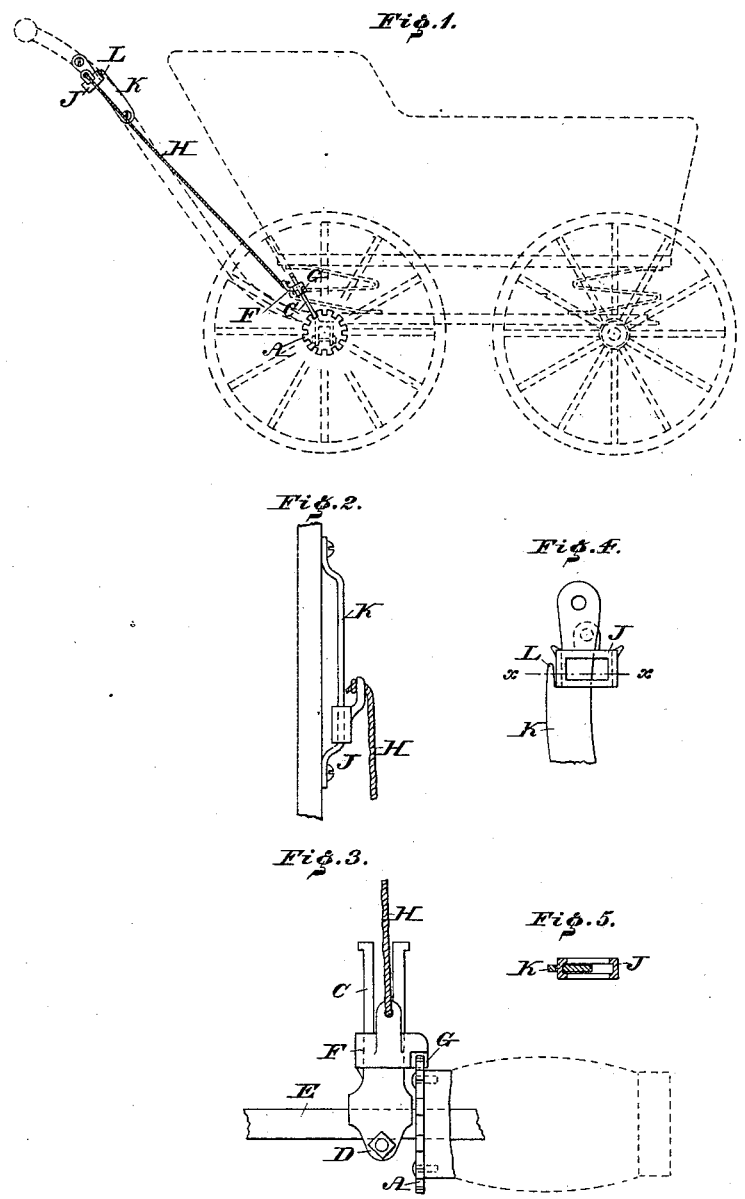
WITNESSES:
Th. Rolle.
Robt Aitow.
INVENTOR:
Chas. E. Luburg.
BY John A. Wiederscheim
ATTORNEY.

UNITED STATES PATENT OFFICE.

CHARLES E. LUBURG, OF PHILADELPHIA, PENNSYLVANIA.

CARRIAGE-BRAKE.

SPECIFICATION forming part of Letters Patent No. 353,870, dated December 7, 1886.

Application filed May 11, 1886. Serial No. 201,867. (No model.)

*To all whom it may concern:*

Be it known that I, CHARLES E. LUBURG, a citizen of the United States, residing in the city and county of Philadelphia, State of Pennsylvania, have invented a new and useful Improvement in Carriage-Brakes, which improvement is fully set forth in the following specification and accompanying drawings, in which—

Figure 1 represents a side elevation of a carriage-brake embodying my invention. Figs. 2 and 3 represent views, respectively, of the upper and lower portions thereof on an enlarged scale. Fig. 4 represents a view of the upper portion of a part thereof on the side opposite to that shown in Fig. 1. Fig. 5 represents a section in line $x$ $x$, Fig. 4.

Similar letters of reference indicate corresponding parts in the several figures.

My invention consists of a brake for a carriage, especially a child's carriage, which may be readily operated, and is strong and durable and inexpensive, as will be hereinafter fully set forth.

Referring to the drawings, A represents a toothed rim or annulus, which is secured to the inner end of the hub of one of the wheels of a child's carriage.

C represents an arm, which is secured by a clip, D, or other fastening, to the axle E of the carriage, inside of the hub of the wheel to which the rim A is fastened. Mounted on said arm is a rising and falling head, F, one side whereof is provided with a tooth, G, which extends parallel with the axle E and occupies such position that when it is lowered it engages with one of the teeth.

Connected with the head F is a cord, chain, or rod, H, the upper end whereof is attached to a slide, J, the latter being fitted on an arm, K, which is rigidly secured to one of the handles of the carriage, said arm having near its upper end a hook, L, on which the slide J may be hung, the width of the opening of the slide J being such that the slide has lateral play, whereby it may be lifted over the hook, both for engaging and disengaging purposes.

When service of the brake is not required, the slide J rests on the hook L and the cord H holds the head F in elevated position, whereby the tooth G is clear of the rim A. When the brake is required, the slide J is raised clear of the hook L and then permitted to drop on the arm K, whereby the head F drops by reason of its own weight, and the tooth G engages with one of the teeth of the rim A, thus locking the wheel and "braking" the carriage.

By means of the slide J and cord H the head F may be raised and the tooth G lifted clear of the rim A. The slide J is raised above the hook L and then dropped, so that it engages with said hook, whereby it is sustained and the tooth G held in elevated position.

Having thus described my invention, what I claim as new, and desire to secure by Letters Patent, is—

1. A hub having a toothed rim, in combination with a gravity-head having a tooth, a slide working on an arm secured to the carriage-handle, and a cord secured to the head and slide, substantially as and for the purpose set forth.

2. In a carriage-brake, means for holding the brake-tooth clear of the carriage wheel or hub, consisting of a slide, a hook, and a connection for said tooth and slide, substantially as described.

3. A toothed rim on the carriage-wheel, an arm with a clip connected with the axle thereof, an arm with a hook on the carriage-handle, and a slide fitted on said arm adapted to engage with said hook, and a cord connecting said slide and head, combined and operating substantially as and for the purpose set forth.

CHAS. E. LUBURG.

Witnesses:
JOHN A. WIEDERSHEIM,
A. P. GRANT.